(12) United States Patent
Grobe et al.

(10) Patent No.: US 6,465,567 B1
(45) Date of Patent: Oct. 15, 2002

(54) PIGMENT PREPARATIONS FOR INKJET PRINTING

(75) Inventors: Michael Grobe, Bergisch Gladbach; Peter-Roger Nyssen, Dormagen; Michael Krause; Karina Kutschkau, both of Leverkusen; Dirk Pfützenreuter, Burscheid, all of (DE)

(73) Assignee: Bayer Akgiengesellschaft, Leverkusan (DE)

( * ) Notice: Subject to any disclaimer, the term of this patent is extended or adjusted under 35 U.S.C. 154(b) by 0 days.

(21) Appl. No.: 09/571,139

(22) Filed: May 15, 2000

(30) Foreign Application Priority Data

May 20, 1999 (DE) .......................... 199 23 072

(51) Int. Cl.$^7$ ..................... C09D 11/10; C08L 25/04; C08L 71/10; C08G 65/00; C08G 65/40
(52) U.S. Cl. .................. 524/611; 524/190; 524/577; 523/160; 528/205
(58) Field of Search ................. 523/160, 161; 106/31.77, 31.89, 496, 498; 524/190, 577, 611; 528/96, 116, 205

(56) References Cited

U.S. PATENT DOCUMENTS

| | | | |
|---|---|---|---|
| 4,597,794 A | | 7/1986 | Ohta et al. ............... 106/20 |
| 4,628,082 A | * | 12/1986 | Lorenz et al. ............ 534/707 |
| 5,091,532 A | | 2/1992 | Kaletta ................... 544/296 |
| 5,125,968 A | * | 6/1992 | Takimoto et al. ......... 106/31.75 |
| 5,221,334 A | | 6/1993 | Ma et al. ............... 106/20 D |
| 5,565,102 A | | 10/1996 | Brandt et al. ........... 210/500.28 |
| 5,734,403 A | * | 3/1998 | Suga et al. ............. 347/101 |
| 5,810,266 A | | 9/1998 | Nyssen et al. ........... 421/5 |
| 5,837,044 A | * | 11/1998 | Santilli et al. .......... 106/31.67 |
| 5,882,390 A | * | 3/1999 | Nagai et al. ............ 106/31.49 |
| 5,888,400 A | | 3/1999 | Tholema et al. .......... 210/644 |
| 5,993,527 A | * | 11/1999 | Tochihara et al. ........ 106/31.85 |
| 6,077,339 A | | 6/2000 | Nyssen et al. ........... 106/31.77 |
| 6,110,266 A | * | 8/2000 | Gonzalez-Blanco et al. .... 106/31.65 |
| 6,152,999 A | * | 11/2000 | Erdtmann et al. ......... 106/31.6 |
| 6,211,346 B1 | * | 4/2001 | Linke et al. ............ 534/707 |

FOREIGN PATENT DOCUMENTS

| | | | |
|---|---|---|---|
| DE | 197 49 082 | | 5/1999 |
| DE | 198 01 759 | | 7/1999 |
| EP | 32289 | * | 7/1981 |
| EP | 0 448 055 | | 9/1991 |
| EP | 0 778 321 | | 6/1997 |
| EP | 0 827 990 | | 3/1998 |
| EP | 0 839 879 | | 5/1998 |
| EP | 0 652 044 | | 5/1999 |
| WO | 97/43351 | | 11/1997 |

* cited by examiner

Primary Examiner—Vasu Jagannathan
Assistant Examiner—Callie E. Shosho
(74) Attorney, Agent, or Firm—Joseph C. Gil; Richard E. L. Henderson

(57) ABSTRACT

The invention relates to pigment preparation having
(a) at least one organic pigment,
(b) at least one optionally ionically modified phenol-styrene polyglycol ether, and
(c) at least one surface-active agent that is
  (i) an oxalkylated acetylene glycol of formula (I)

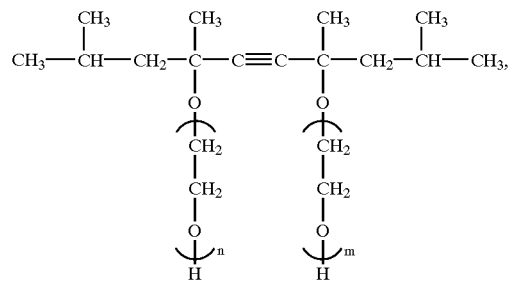

wherein n is 0 to 14, m is 0 to 14, and m+n is 0 to 14, and/or
(ii) compounds having the formulas (II), (III), and (IV)

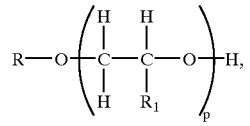

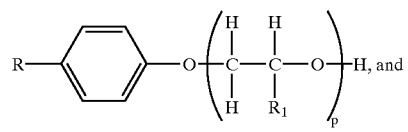

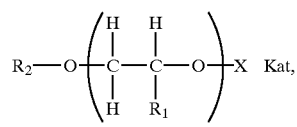

wherein R is $C_6$–$C_{18}$-alkyl. $R_1$ independently denotes H or $C_1$–$C_4$-alkyl, p is from 3 to 60, $R_2$ is R or optionally $C_1$–$C_{18}$-alkyl-substituted phenyl, X is $-SO_3^-$, $-SO_2^-$, $-PO_3^=$, or $-CO-(R^3)-COO-$; $R_3$ is a divalent aliphatic or aromatic radical, and Kat is a cation.

20 Claims, No Drawings

PIGMENT PREPARATIONS FOR INKJET PRINTING

The present invention relates to pigment preparations for inkjet printing comprising pigment, a dispersant from the group consisting of optionally ionically modified phenol-styrene polyglycol ethers and a surface-active agent from the group consisting of oxalkylated acetylene glycols or of optionally modified alkyl (aryl)polyglycol ethers, to a process for preparing them and to their use as inks for inkjet printing.

In recent years, the use of inkjet printing, as a "non-impact", computer-controlled printing method, has increased greatly. Inkjet printers are "drop-on-demand" printers, in which by means of an electronic signal drops of liquid inks are generated and are sprayed onto suitable substrates such as paper or films, where they generate the desired image. With the use of inks based on 4 primary colours such as black, yellow, cyan and magenta, and the computer technique for generating, altering and storing image, text or graphic information, images of high resolution can be produced in virtually the entire visual colour space. The header "drop-on-demand" encompasses two different printing systems, as described, for example, in U.S. Pat. No. 4,597,794.

In thermal inkjet printing, drops are produced by introducing thermal energy into the ink liquid. The systems available today are distinguished by a high technical standard for colour images of high optical quality, up to photo quality, and are also suitable for large-format prints and high printing speeds.

In piezo inkjet printing, the drops are generated by means of a piezoelectric element which by application of an electrical voltage is stimulated and ejects the ink continuously, or on demand. Today, this system too has reached a similarly high standard to the thermal system.

In both systems the inks used most widely to date have been based on solutions of water-soluble dyes in an aqueous-organic medium. The advantages of dye-based inks, such as high brilliance and optical density of the prints, however, are countered by a number of disadvantages. Those that may be mentioned include the inadequate light fastness of the dyes, the penetration into the paper fibres and running in the paper (feathering, inadequate edge definition), and inadequate smear resistance and water resistance of the prints, owing to the water solubility of the dyes. For this reason, high-quality prints are in many cases obtained only on special papers.

One alternative is represented by water-based inks comprising as their colouring components organic colour pigments in their particulate form. Given an appropriate choice of pigments, pigment-based ink systems possess markedly better fastness properties, especially light fastness and weather fastness, so that there is particular interest in their use in applications where this property is particularly prized, such as, for example, for prints for posters and displays, and for photographic reproductions.

The pigmented inks currently available on the market, however, still have a number of disadvantages. In terms of colour brilliance, they have still not attained the quality of dye inks. Furthermore, the tendency of the suspended particles to agglomerate means that problems such as long-term storage stability of the inks and undisrupted printing behaviour have not yet been satisfactorily solved. These defects can be caused, for example, by clogging of the fine nozzle apertures, deposits, or settling of the particles or ingredients of the inks on the printing head materials, especially the heating elements, and also drying or deposits at the nozzle outlet.

In order to eleminate the said problems, especially those relating to the agglomeration behaviour, particular importance is attached to the physical stabilization of the pigment particles in the aqueous-organic carrier medium of the inks. It is the state of the art here to use dispersants which stabilize the particles electrostatically and/or sterically. Effective stabilization is achieved with steric dispersants, whose molecules generally possess both hydrophobic moieties, which have affinity for the pigment surfaces, and hydrophilic, long-chain moieties, which bring about the actual steric hindrance in the aqueous-organic medium.

In accordance with U.S. Pat. No. 4,597,794, polymeric dispersants, especially random copolymers, are preferred for inkjet printing, or very specific block copolymers as used in EP 518 225. Although polymeric dispersants are often considered superior to the oligomeric dispersants for aqueous pigmented printing inks, their widespread use does not yet appear to have been successful. In particular, there are still a number of disadvantages to be overcome, in relation to adverse interactions of these agents in the ink formulations or the recording material or the elements of the printing head.

For example, the organic solvents used in the aqueous-organic carrier media of the inks may, depending on their nature and proportions, impair the storage stability of the inks. This applies even to surface-active agents which are used in the inks as additional ink constituents in order to improve the drying properties on the substrates. Since agents of this kind may form micelles in the inks, they may impair the affinity of the polymers for the pigment surface and/or for the aqueous-organic carrier medium as well and so may lead to reagglomeration of the pigment particles.

Furthermore, it is known from, for example, WO 97/43351 that there are other problems with printing inks when using polymeric dispersants, such as, for example, a non-uniform printed image in the case of prolonged printing, owing to cogation—that is, deposits on the heating elements of the printing cartridge.

In order to overcome the disadvantages mentioned, WO 97/43351 recommends the use of oligomeric dispersants based on N-substituted amino acids, which are rendered water-soluble by the introduction of ionic groups and can be understood as electrostatically acting dispersants. Nevertheless, the examples show that stable inks cannot be prepared with all of the pigments in question.

The abovementioned prior art also mentions, as additional ink constituents, surface-active agents (wetting agents) with which the surface tension of the inks and, in particular, the wetting and drying behaviour of the inks on the substrates can be adjusted. Suitable such agents include alkylphenol oxalkylates (WO 97/43351) and, inter alia, acetylenediol derivatives, Na sulphosuccinates and also alkylaryl polyethers (EP 0 518 225).

The fact is, however, as already remarked above, that the use of just such agents affects a large number of parameters, so that it is not simple to find an appropriate combination.

Particular importance is also attached to the selection of the pigments for the establishment of a trichromatic system in the primary colours such as, for example, magenta, cyan and yellow and, if desired, further colours in order to establish an extended colour space. Suitable pigments, and printing inks produced from them, are required to satisfy very stringent requirements in terms of colour brilliance, transparency and light fastness. The pigmented printing inks produced in accordance with the prior art are not yet entirely satisfactory in this respect. This applies in particular to the colour locus yellow. In order to achieve sufficient transparency and brilliance, and also good printing properties, the pigments must be present stably in very fine distribution (very small particles) in the printing inks, which for many pigments, especially in the yellow region, is associated with a deterioration in light fastness. For example, commercially available pigmented inks exhibit a poorer light fastness in the yellow hue than in cyan and magenta, which may lead to unwanted changes in colour (greying) and loss of brilliance under the effect of light.

The colour brilliance achievable is, furthermore, not dependent solely on the particle fineness but also on the wetting characteristics of the inks on the substrate. In this respect there is still considerable room for improvement, especially for printing on uncoated papers.

EP-A 839 879 describes pigment preparations for inkjet printing which in order to stabilize the pigments and, in particular, yellow pigments of high fastness use dispersants selected from the group of optionally ionically modified phenol-styrene polyglycol ethers or naphthalenesulphonic acid condensation products. Printing inks produced from these pigment preparations do, however, require further improvement in respect of brilliant printed images and in respect of drying behaviour on different substrates.

The object of the present invention was to provide aqueous pigment preparations for inkjet printing which do not have the disadvantages described above.

Surprisingly, pigment preparations have now been found comprising a) at least one organic pigment,
b) at least one optionally ionically modified phenol-styrene polyglycol ether and
c) at least one surface-active agent (surfactant) from the group consisting of oxalkylated acetylene glycols in accordance with the formula (I)

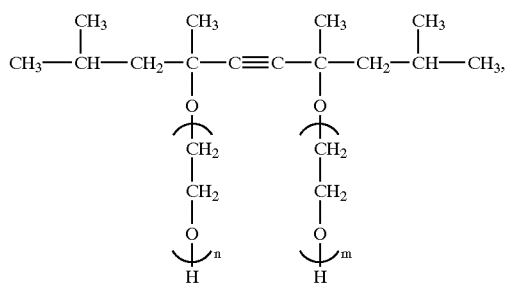

(I)

where
n=0 to 14,
m=0 to 14 and
m+n=0 to 14, preferably 3 to 14
and/or from the group consisting of compounds of the formulae II, III and IV

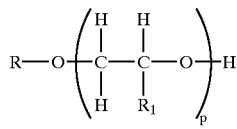

(II)

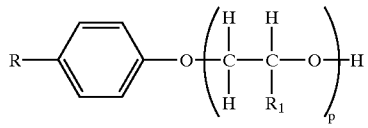

(III)

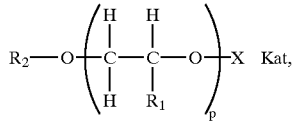

(IV)

in which
R represents linear or branched $C_6$–$C_{18}$-alkyl,
$R_1$ independently at each occurrence denotes H or $C_1$–$C_4$-alkyl, especially methyl,
p is a number from 3 to 60, preferably from 3 to 30, in particular from 3 to 12,
$R_2$ denotes R or optionally $C_1$–$C_{18}$-alkyl-substituted, especially $C_6$–$C_{18}$-alkyl-substituted phenyl,
X denotes the group —$SO_3^-$, —$SO_2^-$, —$PO_3^=$ or —CO—($R_3$)—$COO^-$,
$R_3$ represents a divalent aliphatic or aromatic radical, preferably $C_1$–$C_4$-alkylene, especially ethylene, $C_2$–$C_4$ monounsaturated radicals, especially acetylene or optionally substituted phenylene, especially ortho-phenylene, possible substituents being preferably $C_1$–$C_4$-alkyl, $C_1$–$C_4$-alkoxy, $C_1$–$C_4$-alkoxycarbonyl or phenyl and
Kat is a cation from the group consisting of $H^+$, $Li^+$, $Na^+$, $K^+$, $NH_4^+$, and HO—$CH_2$—$CH_2$—$NH_3^+$, and in the case of —$PO_3^=$ there are two Kat cations.

Pigments of Component a)

A great diversity of organic pigments, alone or in combination, are suitable in principle. They can be used either in the form of their dry powders or else as water-moist presscakes.

Examples of suitable organic pigments are those of the monoazo-, disazo-, laked azo, β-naphthol, naphthol AS, benzimidazolone, disazo condensation, azo metal complex, isoindoline and isoindolinone series, and also polycyclic pigments such as, for example, those from the phthalocyanine, quinacridone, perylene, perinone, thioindigo, anthraquinone, dioxazine, quinophthalone and diketopyrrolopyrrole series, and also laked dyes such as Ca, Mg and Al lakes of dyes containing sulphonic acid or carboxylic acid groups, and also carbon blacks, which are pigments for the purposes of this specification and of which a large number are known, for example, from the Colour Index, $2^{nd}$ edition. Mention may be made in particular of acidic to alkaline carbon blacks from the gas or furnace black process, and also chemically surface-modified carbon blacks, for example sulpho- or carboxyl-containing carbon blacks.

Particularly suitable pigments are organic pigments from the above group having a light fastness rating, as evaluated by means of the blue scale following exposure of the full-area inkjet prints produced therefrom on papers, exposure being carried out using suitable xenon arc lamps (DIN 54004; e.g. Xenon Test 450$^R$), of greater than 6, in particular greater than 7.

A selection of particularly suitable organic pigments is given in the following table:

| Hue | Pigment Colour Index | Example | Manufacturer |
|---|---|---|---|
| Magenta | C.I. Pigment Red 122 Quinacridone | Quindo Magenta RV 6831 ® | Bayer AG |
| | C.I. Pigment Red 202 Quinacridone | Quindo Magenta RV 6843 ® | Bayer AG |
| Red | C.I. Pigment Red 254 Diketo-pyrrolo-pyrrole | Cromophtal DPP Rot BO ® | Ciba |
| | Pigment Red 272 Diketo-pyrrolo-pyrrole | Cromophthal DPP Flammrot FP ® | Ciba |
| Blue | C.I. Pigment Blue 15:3 Cu phthalocyanine β | Phthalo Blue G ® | Mac Cruder |
| | Pigment Blue 15:4 Cu phthalocyanine β | Heliogen Blau L 7101F ® | BASF |
| Green | C.I. Pigment Green 7 Cu phthalocyanine, chlorinated | Heliogen Grün K 8730 ® | BASF |
| | C.I. Pigment Green 36 Cu phthalocyanine, halogenated | Heliogen Grün K 9360 ® | BASF |
| Yellow | C.I. Pigment Yellow 109 Isoindolinone | Irgazin Gelb 2GLTE ® | Ciba |
| | C.I. Pigment Yellow 128 Disazo condensation | Cromophtal Gelb 8GN ® | Ciba |
| | C.I. Pigment Yellow 150 Azo nickel complex | Gelbpigment E4GN ® | Bayer |
| | C.I. Pigment Yellow 151 Benzimidazolone | Hostaperm Yellow H4G ® | Clariant |
| Orange | C.I. Pigment Orange 36 Benzimidazolone | Novoperm Orange HL ® | Clariant |
| | C.I. Pigment Orange 60 Benzimidazolone | | |
| | C.I. Pigment Orange 64 Benzimidazolone | Cromophtal Orange GP ® | Ciba |
| | C.I. Pigment Orange 71 Diketo-pyrrolo-pyrrole | Cromophthal DPP Orange TRP ® | Ciba |

With particular preference, the yellow ink contains an inclusion or intercalation compound of pigments of the general formula V or VI, the compound included being a cyclic or acyclic compound, preferably carboxamides or sulphonamides, urea or substituted ureas, and heterocycles, especially 2,4,6-triamino-1,3,5-triazine, acetoguanamine and/or benzoguanamine.

Formula V:

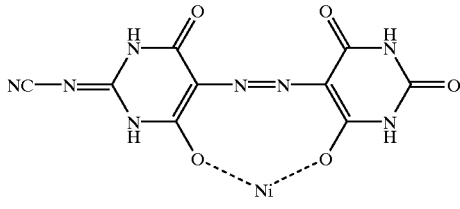

Formula VI:

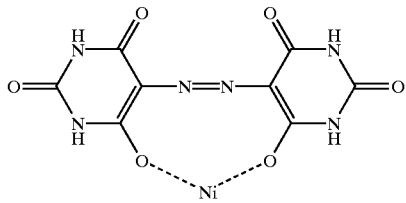

Dispersants of Component b)

Optionally ionically modified phenol-styrene polyglycol ethers of component b) are known, for example, from DE-A-19644 077. Preferred compounds of component b) have an HLB of from 10 to 20, in particular from 12 to 18.

Preferred alkoxylation products of phenol-styrene condensates are those of the formula (X)

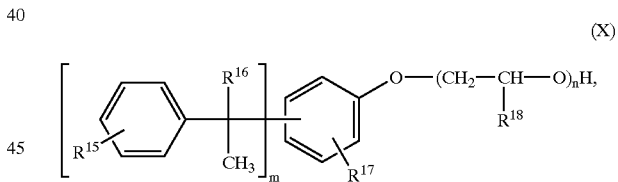

in which
$R^{15}$ denotes hydrogen or $C_1$–$C_4$-alkyl,
$R^{16}$ represents hydrogen or $CH_3$,
$R^{17}$ denotes hydrogen, $C_1$–$C_4$-alkyl, $C_1$–$C_4$-alkoxy, $C_1$–$C_4$-alkoxycarbonyl or phenyl,
m denotes a number from 1 to 4,
n denotes a number from 6 to 120,
$R^{18}$ is identical or different for each unit indicated by n and represents hydrogen, $CH_3$ or phenyl, and, in the case where $CH_3$ is present in the various —(—$CH_2$—$CH(R^{18})$—O—)— groups, $R^{18}$ represents $CH_3$ in from 0 to 60% of the overall value of n and $R^{18}$ represents hydrogen in from 100 to 40% of the overall value of n and, where phenyl is present in the various —(—$CH_2$—$CH(R^{18})$—O—)— groups, $R^{18}$ represents phenyl in from 0 to 40% of the overall value of n and $R^{18}$ represents hydrogen in from 100 to 60% of the overall value of n.

Preferred ionically modified phenol-styrene polyglycol ethers are those of formula (XI)

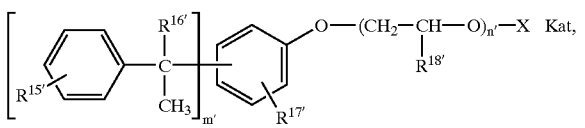

(XI)

in which

R$^{15'}$, R$^{16'}$, R$^{17'}$, R$^{18'}$, m' and n' adopt the scope of definition of R$^{15}$, R$^{16}$, R$^{17}$, R$^{18}$, m and n, respectively, but independently thereof, X denotes the —SO$_3^\ominus$, —SO$_2^\ominus$, —PO$_3^{\ominus\ominus}$ or —CO—(R$^{19}$)—COO$^\ominus$, Kat is a cation from the group consisting of H$^\oplus$, Li$^\oplus$, Na$^\oplus$, K$^\oplus$, NH$_4^\oplus$ or HO—CH$_2$—CH$_2$—NH$_3^\oplus$, and in the case of X=—PO$_3^{\oplus\oplus}$ there are two Kat cations, and R$^{19}$ represents a divalent aliphatic or aromatic radical, preferably C$_1$–C$_4$-alkylene, especially ethylene, C$_2$–C$_4$ monounsaturated radicals, especially acetylene, or optionally substituted phenylene, especially orthophenylene, possible substituents being preferably C$_1$–C$_4$-alkyl, C$_1$–C$_4$-alkoxy, C$_1$–C$_4$-alkoxycarbonyl or phenyl.

Preference is also given in particular to mixtures of these condensates of the formulae (X) and (XI).

Particularly preferred compounds of the formulae (X) and (XI) are obtained by conducting the oxalkylation in blocks both with ethylene oxide and with propylene oxide. Very particularly preferred compounds are those which have at the beginning a block comprising from 1 to 20 molar units of propylene oxide and optionally at the end a block comprising from 1 to 10 molar units of propylene oxide. Through the choice of the blockwise alkoxylation it is possible to optimize the affinity for pigment surfaces of varying hydrophobicity, as required, and to favourably influence the stability of the printing inks.

With further preference, the pigment preparations of the invention may additionally comprise as component d) at least one condensation product based on A) sulphonated aromatics, B) aldehydes and/or ketones and optionally C) one or more compounds selected from the group consisting of nonsulphonated aromatics, urea and urea derivatives.

Products of this kind are disclosed, for example, in DE-A-19 801 759.

"Based on" means that the condensation product has been prepared optionally from further reactants in addition to A, B and, if present, C. Preferably, however, for the purposes of this specification the condensation products are prepared only from A, B and, if present, C.

For the purposes of this specification, the sulphonated aromatics of component A) include sulphomethylated aromatics. Preferred sulphonated aromatics are: naphthalenesulphonic acids, phenolsulphonic acids, dihydroxybenzenesulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, especially 2-hydroxybiphenyl, sulphonated terphenyl or benzenesulphonic acids.

Particularly suitable aldehydes and/or ketones of component B) are aliphatic, cycloaliphatic and aromatic examples. Preference is given to aliphatic aldehydes, with particular preference formaldehyde and other aliphatic aldehydes having 3 to 5 carbon atoms.

Examples of suitable nonsulphonated aromatics of component C) are phenol, cresol, 4,4'-dihydroxydiphenylsulphone or dihydroxydiphenylmethane.

Examples of urea derivatives that can be mentioned include dimethylolurea, melamine or guanidine.

The condensation product used in component d) is preferably one based on

A) at least one sulphonated aromatic selected from the group consisting of naphthalenesulphonic acids, phenolsulphonic acids, dihydroxybenzene-sulphonic acids, sulphonated ditolyl ethers, sulphomethylated 4,4'-dihydroxy-diphenyl sulphone, sulphonated diphenylmethane, sulphonated biphenyl, sulphonated hydroxybiphenyl, especially 2-hydroxybiphenyl, sulphonated terphenyl and benzenesulphonic acids, B) formaldehyde and optionally C) one or more compounds selected from the group consisting of phenol, cresol, 4,4'-dihydroxydiphenyl sulphone, dihydroxydiphenylmethane, urea, dimethylolurea, melamine and guanidine.

The condensation product obtained preferably in the condensation possesses an average degree of condensation of preferably from 1 to 150, with particular preference from 1 to 20, in particular from 1 to 5.

The condensation products of component d) can be used in the form of an aqueous solution or suspension or as a solid, for example as a powder or granules, preferably as spray-dried powder or granules.

Preferred condensation products of component d) have an inorganic salt content of less than 10% by weight, preferably less than 5% by weight, in particular less than 1% by weight, based on the aqueous solution or suspension of component d) that is used or based on the solid of component d) that is used.

It is likewise preferred to use condensation products of component d) which are low in or free from residual monomers.

"Low in residual monomers" implies a residual monomer content of less than 30% by weight, preferably less than 20% by weight, based on the condensation product, in particular <10% by weight, preferably <5% by weight. Residual monomers in this context mean the reactants used to prepare the condensation product.

Examples of low-salt and low-residual-monomer condensation products of this kind are known from EP-A 816 406.

The condensation products of component d) can be prepared, for example, by first preparing the sulphonated aromatics of component A), optionally in a mixture with unsulphonated aromatics of component C), by reacting the parent aromatics with a sulphonating agent, preferably sulphuric acid, especially concentrated sulphuric acid, chlorosulphonic acid, amidosulphonic acid or oleum.

From 0.4 to 3.2 mol, in particular from 0.8 to 1.6 mol, of sulphonating agent are preferably used per mole of the parent aromatic of component A).

This is followed by the condensation with aldehydes and/or ketones of components B), preferably formaldehyde, optionally together with further compounds of component C). The condensation takes place preferably in aqueous solution at a pH of from 0 to 9. In this reaction, from 0.4 to 1.5 mol, in particular from 0.4 to 1.0 mol, of component B) are preferably used per mole of the sulphonated aromatic A) or per mole of a mixture of sulphonated aromatics of component A) and nonsulphonated aromatics of component C).

This is followed, optionally, by neutralization of the sulphonic condensation product of component d) with a base.

The separation of the inorganic acid or its salts and the reduction of the residual monomer content can be carried out, for example, by means of membrane separation techniques. Preferred membrane separation techniques in this context are ultrafiltration, diffusion dialysis or electrodialysis.

The membranes used in the membrane separation techniques, preferably in the ultrafiltration, possess in one preferred embodiment a molecular weight cut-off (MWCO) of from 1000 to 50,000 daltons.

Separating off the inorganic acid by means of a membrane separation technique is preferably done by the method of diafiltration using acid-stable ultrafiltration or nanofiltration membranes in cross-flow filtration mode. Examples of suitable membranes in this case are polyhydantoin membranes, as are known from EP-A 652 044.

Preferred membranes for this purpose possess an MWCO level of from 2000 to 20,000 daltons. Optionally, concentration is carried out simultaneously in this step of the technique.

In addition to the components a) to d), the pigment preparations of the invention can also contain water, which is preferably the major constituent of the preparations, and further suitable additives; the additives customary for inkjet printing are particularly suitable.

For example, organic solvent may be present as a further component e) which is suitable for adjusting the ink viscosity and for controlling the drying behaviour during the printing operation and on the substrate. The ink stability as well, and other printing properties such as drop formation itself and the formation of satellite drops, and also properties of the printed image, may be influenced by the choice of solvents. In general, the person skilled in the art will tailor the choice of appropriate solvents experimentally to the other said constituents of the formulation.

Together with water, the organic solvents form the aqueous-organic carrier medium of the inks. Particular suitable organic solvents are those which are soluble in water, preferably those having a solubility of more than 0.5 g/100 g of water.

Examples of suitable organic solvents are the following: aliphatic $C_1$–$C_4$ alcohols, such as methanol, ethanol, isopropanol, n-propanol, n-butanol, isobutanol or tert-butanol, aliphatic ketones, such as acetone, methyl ethyl ketone, methyl isobutyl ketone or diacetone alcohol, polyols, such as ethylene glycol, propylene glycol, butylene glycol, 1,4-butanediol, 1,5-pentanediol, 1,6-hexanediol, diethylene glycol, triethylene glycol, trimethylolpropane, polyethylene glycol or polypropylene glycol having an average molar weight of from 100 to 4000 g/mol, preferably from 200 to 1500 g/mol, or glycerol, monohydroxy ethers, preferably monohydroxyalkyl ethers, with particular preference mono-$C_1$–$C_4$-alkyl glycol ethers such as ethylene glycol monoethyl or monomethyl ether, diethylene glycol monomethyl ether or diethylene glycol monoethyl ether, diethylene glycol monobutyl ether, dipropylene glycol monoethyl ether, thiodiglycol, triethylene glycol monomethyl ether or monoethyl ether, and also 2-pyrrolidone, N-methyl-2-pyrrolidone, N-ethylpyrrolidone, N-vinylpyrrolidone, 1,3-dimethyl-imidazolidone, dimethylacetamide and dimethylformamide.

Mixtures of these solvents are also suitable. The amount of the sum of the solvents used in the pigment preparations is generally less than 60% by weight, preferably less than 40% by weight.

Preferably, the amount of water and organic solvent is from 1 to 99.9, in particular from 30 to 99, % by weight, based on the pigment preparation.

The pigment preparations may further include agents for adjusting the viscosity, such as, for example, polyvinyl alcohol, nonionic or ionic polyhydroxy compounds, polyvinylpyrrolidone, methylcellulose and other agents known to the person skilled in the art, provided that they do not adversely affect the stability of the aqueous pigment preparation and the printing properties and also the behaviour on the substrate.

The pigment preparations of the invention may, moreover, contain further ionic or nonionic auxiliaries. Where the compounds of component b), c) or optionally d) already present contain ionic groups, these auxiliaries should preferably be nonionic or of the same ionicity.

In principle, the pigment preparations of the invention may also comprise preservatives, light stabilizers, further surfactants and, optionally, pH regulators.

Examples of pH regulators are NaOH, ammonia or aminomethylpropanol, N,N-dimethylaminoethanol.

Examples of light stabilizers are UV absorbers.

The pigment preparations of the invention, which are preferably aqueous, preferably contain, based on the preparation, from 0.1 to 50% by weight, preferably from 0.1 to 30% by weight, of pigment of component a), from 0.005 to 20% by weight, preferably from 0.02 to 10% by weight, of an optionally ionically modified phenol-styrene polyglycol ether of component b), from 0.005 to 10% by weight, preferably from 0.05 to 1.5% by weight, of a surface-active agent of component c), from 0 to 20% by weight, preferably from 0 to 10% by weight, of a condensation product of component d), and from 0 to 99.8% by weight of an aqueous-organic carrier medium consisting of water and optionally organic solvent of component e), and optionally further customary additives of the abovementioned type.

The present invention improves the following properties important for inkjet printing with aqueous pigmented printing inks.

High physical stability of the printing inks against reagglomeration, sedimentation and separation during long-term storage prior to use and over the period of use.

Minimizing of deposits on the heating elements or other materials of the printing head.

Very good print recommencement characteristics after printer standstill and no clogging of the nozzles or encrustation/drying on the nozzle outlet surfaces, and also undisrupted and error-free long-term printing behaviour.

High brilliance of the colours when printing on coated and uncoated (standard) papers, and also high transparency on films.

Good penetration and drying properties on the stated substrates in conjunction with good smear fastness and water fastness properties.

Coverage of a very large colour space by means of a trichromatic system of, for example, the colours magenta, cyan and yellow through the use of pigments which possess light fastness at an equally high level.

The invention further relates to a set of printing inks comprising at least 4 printing inks in the colours black, cyan, magenta and yellow, characterized in that at least one printing ink corresponds to the aqueous pigment preparation of the invention.

Preference is given to a set of printing inks in which the black printing ink contains carbon black as colorant, in particular a carbon black from the group of the acidic gas blacks or furnace blacks.

Likewise preferred is a set of printing inks whose cyan printing ink contains a pigment from the group of the chlorinated Cu phthalocyanine pigments, in particular a pigment having the Colour Index Pigment Blue 15:3 or Pigment Blue 15:4.

Likewise preferred is a set of printing inks whose magenta printing ink contains a pigment from the group of the quinacridone pigments, preferably Colour Index Pigment Red 122.

Likewise preferred is a set of printing inks whose yellow printing ink contains a pigment from the group of the inclusion or intercalation compounds of pigments of the general formula V or VI, the inclusion or intercalation compounds suitably being preferably the abovementioned compounds, which are known, for example, from DE-A 3 935 858 and DE-A 19 712 486 (preferably in Example 1).

In one particular embodiment, the set of printing inks comprises as black printing ink a pigment preparation comprising a pigment from the group of the carbides, nitrides, borides and silicides of the elements Ti, Zr, Hf, Si, Ge and Sn having an average primary particle size of from 0.1 to 50 nm, in particular ZrN, TiN, TiC or SiC, as disclosed in DE-A 19 749 082.

In accordance with the invention the set of printing inks, for the purpose of expanding the achievable colour space of the desired images, may include further printing inks. Suitable such inks include, firstly, pigment preparations of the invention as printing inks of the stated type, and also other printing inks in pure hues other than those specified; in particular, further printing inks of the set are characterized in that, in addition to components b), c), optionally d) and e), the pigment of component a) of an orange printing ink is a pigment from the series of benzimidazolone or diketo-pyrrolo-pyrrole pigments and the pigment of component a) of a green printing ink is a pigment from the series of the chlorinated or halogenated Cu phthalocyanine pigments, preferably a pigment having the Colour Index Pigment Green 7 or Pigment Green 36.

The invention further relates to the preparation of the printing inks of the invention, which is characterized in that in a first step at least one pigment of component a) together with at least one dispersant of component b) and optionally surface-active agent of component c) and also optionally dispersant of component d) and optionally further additives is homogenized in water and is preferably wet-comminuted to the desired particle size of preferably from 0.002 to 2 $\mu$m, in particular from 0.002 to 0.5 $\mu$m. Subsequently, in a second step, the resulting aqueous pigment preparation is introduced into the aqueous-organic carrier medium consisting of water and optionally one or more organic solvents of component e) together with any further surface-active agent of component c) that is required and optionally further additives and is homogenized to give the ready-to-use printing ink. Following the homongenization it may also be necessary to filter the ink in order to eliminate impurities or particles having a primary particle size of more than 2 $\mu$m, preferably more than 0.5 $\mu$m.

In general, the pigment, in powder form or in the form of the water-moist presscake, is beaten (i.e. introduced and homogenized) together with a portion of the dispersant and water, preferably deionized water, for example by means of a stirred vat, dissolver and similar machines, optionally after precomminution, to form a homogeneous millbase suspension.

The millbase suspension may additionally include portions of low-boiling solvents (boiling point <150° C.) which can be carried off, through evaporation, in the course of the subsequent fine milling. However, it may also contain portions of higher-boiling solvents or further additives, as are described above, e.g. milling assistants, defoamers or wetting agents.

The wet comminution comprises not only the precomminution but also the fine milling. The pigment concentration of the suspension is preferably above the desired concentration of the finished pigment preparation or printing ink. The desired pigment end concentration is preferably established only after the wet comminution. The precomminution is followed by milling to the desired particle fine division of from 0.002 to 2 $\mu$m, preferably from 0.002 to 0.5 $\mu$m. Apparatus suitable for this milling includes, for example, kneaders, roll mills, kneading screws, ball mills, rotor-stator mills, dissolvers, corundum disc mills, vibratory mills and especially high-speed, continuously or discontinuously charged stirred ball mills with grinding media having a diameter of from 0.05 to 5 mm. The grinding media can be of glass, ceramic or metal, e.g. steel. The milling temperature is preferably within the range from 0 to 250° C., but generally at room temperature, in particular below the turbidity point of the surface-active agent of component c) that is used.

In a similarly preferred procedure, the milling can take place wholly or partly in a high-pressure homogenizer or in a so-called jet disperser (known from DE-A 19 536 845), whereby the level of grinding media detritus in the suspension or the release of soluble substances from the grinding media (e.g. ions from glass media) can be reduced to a minimum or prevented completely.

A particularly advantageous process for preparing the pigment preparations is one in which, for the purpose of stabilization, sufficient dispersant is made available in the milling step for preparing the pigment concentrate. Thereafter, or following dilution with water, dispersant present in solution and not adsorbed on the pigment, and/or excess surface-active agents, are preferably removed and, subsequently, the desired pigment preparation is standardized by adding the remaining portions of the pigment preparation.

A process for removing dispersant present in solution is, for example, the centrifuging of the suspension and subsequent decanting of the supernatant.

Also of particular advantage is a process for preparing pigment preparations likewise of the invention, characterized in that following the wet comminution and standardization described the aqueous suspension is dried, preferably by means of spray drying, freeze drying or spray-freeze drying, preference being given to a residual moisture content of from 0 to 10% by weight, more preferably from 0.1 to 4% by weight.

In a second step, the resulting pigment preparation in aqueous or dried form is introduced and homogenized, as described above, into the aqueous-organic carrier medium, optionally together with the surface-active agent of component c), this being accompanied by adjustment to the desired colour strength of the printing ink and the addition of any further additives required. In this step it is also possible, if desired, to add a portion of the dispersant of component b) or optionally d) in order, for example, to prevent reagglomeration of the fine pigment particles in the diluent (dilution shock).

In addition, other polymeric additives such as, for example, polyurethane polymers or acrylic polymers can be added in order to improve further the water fastness of the prints, if necessary; for example, for outdoor applications. These polymers can be either water-soluble or else water-emulsifiable in nature, or may be soluble in one of the solvents of component e) that is used.

In a particularly preferred procedure, mixing and homogenization to give the ink is carried out using a jet disperser or high-pressure homogenizer at pressures of from 5 to 2500 bar, in particular from 20 to 1000 bar, in order to prevent the formation of foam and to avoid possible reagglomeration.

The invention further relates to the use of the pigment preparations of the invention as printing inks for inkjet printing.

The standardizing of the desired pigment preparations also involves standardization to the desired viscosity, colour strength, hue, density and surface tension of the preparation.

Prior to their use as printing inks, the inks are optionally fine-filtered by means, for example, of 0.5 to 5 μm membrane filters or glass filters.

In general, the physical ink properties are adjusted for use in conventional inkjet printers, for which the surface tension should be from 20 to 70 mN/m, in particular from 30 to 45 mN/m, and the viscosity less than 20 mPa·s, preferably from 0.5 to 10 mPa·s.

When used as printing inks in inkjet printing, the preparations of the invention provide prints having excellent light fastness and brilliance and additionally possess the following advantages: outstanding dispersion stability and storage stability over a wide temperature range, no so-called cogation or clogging in the printing head, high water fastness and migration fastness of the prints on various substrates, for example on chemical paper, average paper quality, sized and coated paper, polymeric films, transparencies for overhead projection; no bleeding in multicolour printing, even when used together with dye inks or other pigmented inks.

Inkjet printing is known per se and generally takes place by the printing ink being introduced into the receiving vessel of an inkjet printing head and sprayed in small droplets onto the substrate. The ejection of ink in droplet form takes place preferably by way of a piezoelectric crystal, a heated canula (bubble-jet or thermo-jet technique) or mechanical pressure increase, in which case pressure is exerted on the ink system and, accordingly, ink drops are ejected. The droplets from one or more small nozzles are fired in a targeted fashion onto the substrate, such as paper, wood, textiles, plastic or metal, for example. Under electronic control, the individual droplets on the substrate are brought together to form text or graphic patterns.

Also possible is a technique in which very small volumes in the form of drops are brought onto a substrate by means of electrostatic deflection.

A method for the use of the pigment preparations of the invention as printing inks is preferably characterized in that the printing inks are sprayed continuously or discontinuously onto a substrate, with formation of drops. The method is characterized in particular in that the drops are generated using the computer-controlled thermal or piezoelectric inkjet printing technique.

Preference is given to the use of printing inks, characterized in that substrates used are coated and uncoated papers, photographic papers, polymeric films, foils and also textiles, glass and metals.

Particular preference is given to the use of the printing inks which is characterized in that papers for graphics applications having formats of greater than DIN A4 are printed.

EXAMPLES

Example 1

1.6 parts of a dispersant mixture (component b)) comprising alkoxylation products of formulae (X) and (XI) having a composition of 37% by weight of formula (X) where
$R^{15}=CH_3$, $R^{16,17,18}=H$
m=2.8
n=29 and
63% by weight of formula (XI) where
$R^{15'}=CH_3$, $R^{16',17',18'}=H$
m'=2.8
n'=29
$X=SO_3^-$
$Kat=NH_4^+$ were melted at 80° C., added to
61.4 parts of deionized water, and dissolved fully. Into the solution,
1.7 parts of the dispersant TAMOL® NH 7519 (BASF AG, component d)) were introduced with stirring and dissolved. Subsequently,
35.0 parts of Spezialschwarz® 4 (Degussa AG) were introduced and precomminuted and homogenized using a dissolver. The pH of the suspension was adjusted to 7.1 using triethanolamine. The suspension was subsequently introduced into a 1 l stirred ball mill (manufactured by Sussmeyer, Brussels) and ground for a period of 3 hours with zirconium oxide beads (fraction 0.4–0.6 mm), with cooling. The aqueous pigment preparation was adjusted to a pigment concentration of 25% using
0.2 parts of the preservative Proxel® GXL, 20% strength (Zeneca) and
0.1 parts of the preservative Preventol® D2 (Bayer AG) and deionized water.

This preparation possesses very good flow properties and excellent suspension stability on storage for 3 months both at room temperature and at 50° C. Aqueous dilutions of this preparation down to a pigment concentration of 2% are similarly stable. The composition is given in Table 1.

Example 2

1.4 parts of a dispersant (component b)) of formula (XI) prepared as disclosed in Example 8 of DE A 19 644 077 were melted at 80° C., added to
18.7 parts of deionized water, and dissolved fully. Into the solution,
6.9 parts of the dispersant TAMOL® NH 7519 (BASF AG, component d)) were introduced with stirring. Subsequently,
72.7 parts of water-moist presscake of the pigment Colour Index Pigment Yellow 150 prepared in accordance with Example 1 of DE A 19644 077 having a solids content of 37.1% were added and the mixture was precomminuted and homogenized using a dissolver. The pH of the suspension was adjusted to 5.5 using dilute sulphuric acid. The suspension was subsequently introduced into a 1 l stirred ball mill (manufactured by Sussmeyer, Brussels) and ground for a period of 3 hours with zirconium oxide beads (fraction 0.4–0.6 mm), with cooling. The aqueous pigment preparation was adjusted to a pigment concentration of 25% using
0.2 parts of the preservative Proxel® GXL, 20% strength (Zeneca) and
0.1 parts of the preservative Preventol® D2 (Bayer AG) and deionized water.

This preparation possesses very good flow properties and excellent suspension stability on storage for 3 months both at room temperature and at 50° C. Aqueous dilutions of this preparation down to a pigment concentration of 2% are similarly stable. The composition is given in Table 1.

Example 3

5.0 parts of a dispersant (component b)) of formula (XI) prepared as disclosed in Example 8 of DE A 19 644 077 were melted at 80° C., added to 11.6 parts of deionized water, and dissolved fully. Into the solution, 3.7 parts of the dispersant TAMOL® NN 9401 SA (BASF AG, component d)) were introduced with stirring. Subsequently, 79.4 parts of water-moist presscake of the pigment Colour Index Pigment Red 122 (QUINDO® Magenta RV 6831, Bayer Corp.) having a solids content of 31.5% were added and the mixture was precomminuted and homogenized using a dissolver. The pH of the suspension was adjusted to 7.2 using triethanolamine. The suspension was subsequently introduced into a 1 l stirred ball mill (manufactured by Sussmeyer, Brussels) and ground for a period of 3 hours with zirconium oxide beads (fraction 0.4–0.6 mm), with cooling. The aqueous pigment preparation was adjusted to a pigment concentration of 25% using 0.2 parts of the preservative Proxel® GXL, 20% strength (Zeneca) and 0.1 parts of the preservative Preventol® D2 (Bayer AG) and deionized water.

This preparation possesses very good flow properties and excellent suspension stability on storage for 3 months both at room temperature and at 50° C. Aqueous dilutions of this preparation down to a pigment concentration of 2% are similarly stable. The composition is given in Table 1.

Example 4

92.1 parts of a commercial water-moist presscake of the pigment Colour Index Pigment Blue 15:3 having a solids content of 38.0% were introduced into a dissolver, 3.7 parts of the dispersant TAMOL® NH 7519 (BASF AG, component d)) were introduced, 0.4 parts of deionized water were added and the mixture was homogenized; subsequently, 3.5 parts of the dispersant mixture as described in Example 1 were melted at 80° C. and introduced and the suspension was homogenized. The pH of the suspension was adjusted to 7.2 using triethanolamine. The suspension was subsequently introduced into a 1 l stirred ball mill (manufactured by Sussrneyer, Brussels) and ground for a period of 3 hours using zirconium oxide beads (fraction 0.4–0.6 mm), with cooling. The aqueous pigment preparation was adjusted to a pigment concentration of 25% with 0.2 parts of the preservative Proxel® GXL, 20% strength (Zeneca) and 0.1 parts of the preservative Preventol® D2 (Bayer AG) and deionized water.

This preparation possesses very good flow properties and excellent suspension stability on storage for 3 months both at room temperature and at 50° C. Aqueous dilutions of this preparation down to a pigment concentration of 2% are similarly stable. The composition is given in Table 1.

TABLE 1

Composition of the pigment preparations (amounts in % by weight)

| Component | Example 1 | Example 2 | Example 3 | Example 4 |
|---|---|---|---|---|
| Spezialschwarz 6 | 25.0 | | | |
| Pigment Yellow 150 | | 25.0 | | |
| Pigment Red 122 | | | 25.0 | |
| Pigment Blue 15:3 | | | | 25.0 |
| Tamol ® N9401 SA (comp. d) | | | 3.7 | |
| Tamol ® NH7519 (comp. d) | 1.2 | 6.4 | | 2.7 |
| Dispersant mixture component b) of formulae (X) and (XI) | 1.1 | | | 2.5 |
| Dispersant component b) of formula (XI) | | 1.3 | 5.0 | |
| DI water | 72.4 | 67.0 | 66.0 | 69.5 |
| Proxel ® GXL (20% strength) | 0.2 | 0.2 | 0.2 | 0.2 |
| Preventol ® D2 | 0.1 | 0.1 | 0.1 | 0.1 |

Examples 5–12

Pigment Preparations in the Form of Printing Inks

The pigment preparations of Examples 1–4 were used to prepare pigment preparations of the invention in the form of printing inks for inkjet printing, using deionized water, organic solvents of component e) and surface-active agents of component c), by initially introducing the water together with solvent and surface-active agent and subsequently introducing parts of the pigment preparations according to Examples 1 to 4. The composition of the pigment preparation for use as printing ink was chosen in each case such that the viscosity of the printing ink was within a range from 1.5 to 5 mpas. The surface-active agents of component c) were as follows:

1) Surfynol® 465 (Air Products) ethoxylate of 2,4,7,9-tetramethyl-5-decyne-4,7-diol according to formula (I)
2) ERKANTOL® NR (Bayer AG) mixture of 2 compounds of formula (II), 85% strength in water, describable by:
   Compound 1: R=isodecyl, $R_1$=H, p=6
   Compound 2: R=2-ethylhexane; $R_1$=$CH_3$, p=6

Preparation was carried out starting from the pigment preparations of Examples 1 to 4 by mixing and stirring with the required amount of DI water and also other additives in a glass container. This was followed by ultrasonication for 1 minute and, if necessary, by pH adjustment using triethanolamine. The composition of the pigment preparations used as printing inks is indicated in Table 2.

Before printing, these pigment preparations were fine-filtered through a 1.2 μm filter in order to remove any grinding media detritus and oversize from the suspension.

The properties in inkjet printing using the printing inks according to Examples 5–12 are compiled in Table 3. Testing was carried out on a DeskJet® HP 1600 printer from Hewlett Packard using the following paper grades:

A=standard paper (uncoated, AGFA®701, Agfa-Gevaert)
B=coated paper "HP Premium" (Hewlett Packard HP®51634Z)
C=gloss paper "HP Glossy" (Hewlett Packard HP®C3837A)

Test Criteria

L*, C*, h: Coloristic values measured using CIELAB System 1976 (CM 3700, Minolta)

Viscosity: Mean value over the shear rate range D=0.5–1000 l/s at 23° C. (Haake RS150, Haake)

Particle diameter: Determined using a disc centrifuge (DCP 1000, Brookhaven)

Print recommencement test: Capacity for print recommencement, determined by means of printing after storage of cartridges open at room temperature for 2 weeks without cleaning, cartridge HP®51645A, Hewlett Packard Full-area test: Visual assessment of a fully printed DIN A4 page using cartridge HP®51645A, Hewlett Packard Print mode: high resolution Paper grade: corresponding to type of paper Text test: Visual assessment of edge definition in 2-colour printing using a commercial dye ink for the background printing: Yellow on magenta background, Black, cyan, magenta on yellow background Testing ink cartridge: cartridge HP®51645A, Hewlett Packard Background: cartridge HP®51640Y, M, Hewlett Packard Print mode: normal Paper grade: A Water test: Visual assessment of the water resistance by allowing drops (0.250 ml) to run over the surface of the paper, at an inclination of 45°, printed with bar patterns after drying for 3.5 minutes and (for 1 hour) at room temperature Cartridge HP®51645A, Hewlett Packard Print mode: normal in the case of paper type A, high resolution in the case of paper B Marker test: Visual assessment of the marker fastness by writing over a bar pattern using solvent-based text markers in three colours after the print had been allowed to dry for 1 hour at room temperature Cartridge HP®51645A, Hewlett Packard Print mode: normal in the case of paper type A, high resolution in the case of paper B Satellite drop test: Visual evaluation on the basis of a text printed out on a white background Cartridge HP®51645A, Hewlett Packard Print mode: normal Paper type A

TABLE 2

Composition and physical properties of the pigment preparations in the form of printing inks (amounts in % by weight)

|  | Ex. 5 | Ex. 6 | Ex. 7 | Ex. 8 | Ex. 9 | Ex. 10 | Ex. 11 | Ex. 12 |
|---|---|---|---|---|---|---|---|---|
| Pigment prep. of Ex. 1 | 20 | | | | 20 | | | |
| Pigment prep. of Ex. 2 | | 4.8 | | | | 4.8 | | |
| Pigment prep. of Ex. 3 | | | 20 | | | | 20 | |
| Pigment prep. of Ex. 4 | | | | 6.8 | | | | 6.8 |
| PEG 300* | | | | 10.0 | | | | 10.0 |
| PEG 200** | 10.0 | 10.0 | 10.0 | | 10.0 | 10.0 | 10.0 | |
| 1,5-Pentanediol | 15.0 | 15.0 | 15.0 | | 15.0 | 15.0 | 15.0 | |
| 2-Pyrrolidone | 5.0 | 2.0 | 5.0 | 5.0 | 5.0 | 2.0 | 5.0 | 5.0 |
| DI water | 49.5 | 67.7 | 49.5 | 77.7 | 49.5 | 67.7 | 49.5 | 77.7 |
| Surfynol ® 465 | 0.5 | 0.5 | 0.5 | 0.5 | | | | |
| Erkantol ® NR | | | | | 0.5 | 0.5 | 0.5 | 0.5 |
| pH | 7.8 | 6.4 | 8.1 | 8.2 | 7.9 | 6.3 | 7.9 | 8.0 |
| Surface tension (mN/m) | 40.6 | 41.7 | 41.5 | 38.2 | 40.9 | 40.1 | 43.7 | 43.1 |
| Particle size (μm) | <200 | <200 | <200 | <200 | <200 | <200 | <200 | <200 |
| Viscosity (mPas) | 3.8 | 2.8 | 4.4 | 1.8 | 3.6 | 2.8 | 3.9 | 1.8 |

*Polyethylene glycol of molar mass 300 g/mol
**Polyethylene glycol of molar mass 200 g/mol
DI = deionized

TABLE 3

| Ink of | Paper type | Print recommencement test | Full-area test | Text test | Water test | Marker Test | Sat. drop test | CIELAB L* | C* | h |
|---|---|---|---|---|---|---|---|---|---|---|
| Ex. 5 | A | 5 | 5 | 4–5 | 4–5(5) | 4(4) | 5 | 26.2 | 3.0 | 70.9 |
| Ex. 5 | B | — | 5 | 5 | 5(5) | 5(5) | 5 | 19.0 | 1.7 | 70.4 |
| Ex. 5 | C | — | 5 | — | — | — | 5 | 31.1 | 3.1 | 75.5 |
| Ex. 6 | A | 5 | 5 | 3 | 5(5) | 5(5) | 5 | 85.9 | 67.9 | 95.8 |
| Ex. 6 | B | — | 5 | 5 | 5(5) | 5(5) | 5 | 84.3 | 80.0 | 95.7 |
| Ex. 6 | C | — | 4–5 | — | — | — | 5 | 88.3 | 80.0 | 96.1 |
| Ex. 7 | A | 5 | 5 | 4–5 | 3(4) | 4(4–5) | 5 | 47.5 | 52.3 | 350.6 |
| Ex. 7 | B | — | 5 | 5 | 5(5) | 5(5) | 5 | 38.6 | 51.9 | 1.2 |
| Ex. 7 | C | — | 3 | — | — | — | 5 | 45.6 | 54.4 | 359.6 |
| Ex. 8 | A | 5 | 5 | 5 | 5(5) | 5(5) | 5 | 56.5 | 44.6 | 246.2 |
| Ex. 8 | B | — | 4–5 | 5 | 5(5) | 5(5) | 5 | 52.2 | 51.7 | 244.7 |
| Ex. 8 | C | — | 4 | — | — | — | 5 | 54.0 | 50.1 | 253.8 |
| Ex. 9 | A | 5 | 5 | 4–5 | 5(5) | 4(4) | 5 | 26.2 | 3.2 | 71.6 |
| Ex. 9 | B | — | 5 | 5 | 5(5) | 4(4–5) | 5 | 19.4 | 1.7 | 71.0 |
| Ex. 9 | C | — | 5 | — | — | — | 5 | 30.9 | 3.1 | 75.4 |
| Ex. 10 | A | 5 | 5 | 3 | 5(5) | 5(5) | 5 | 86.6 | 66.1 | 96.9 |
| Ex. 10 | B | — | 4 | 5 | 5(5) | 5(5) | 5 | 83.9 | 81.4 | 95.4 |
| Ex. 10 | C | — | 4–5 | — | — | — | 5 | 88.2 | 82.3 | 95.9 |
| Ex. 11 | A | 5 | 5 | 4–5 | 3(4) | 4–5(5) | 5 | 47.2 | 50.4 | 352.3 |
| Ex. 11 | B | — | 5 | 5 | 5(5) | 5(5) | 5 | 39.9 | 52.8 | 0.4 |
| Ex. 11 | C | — | 4 | — | — | — | 5 | 46.2 | 56.1 | 358.3 |

TABLE 3-continued

| Ink of | Paper type | Print recommencement test | Full-area test | Text test | Water test | Marker Test | Sat. drop test | CIELAB L* | C* | h |
|---|---|---|---|---|---|---|---|---|---|---|
| Ex. 12 | A | 5 | 4–5 | 5 | 5(5) | 5(5) | 5 | 55.6 | 44.2 | 247.0 |
| Ex. 12 | B | — | 3–4 | 5 | 5(5) | 5(5) | 5 | 48.3 | 50.2 | 249.2 |
| Ex. 12 | C | — | 3 | — | — | — | 5 | 52.9 | 50.1 | 255.9 |

Evaluation scale
ratings 1–5 where rating 1: = very poor

When printed on coated large-format paper on a "Design-Jet® HP-2500" (Hewlett Packard) large-format printer, the pigment preparations in the form of printing inks printed reliably and flawlessly to give printed images in colour-image designs having excellence brilliance and a high level of light fastness.

Examples 13–18

Further pigment preparations based on Colour Index Pigment Green 7, Pigment Green 36 and Pigment Orange 64 pigments were prepared as described in Example 1 and processed to printing inks as in Examples 5 to 8.

The composition of the pigment preparations (Examples 13 to 15) is indicated in Table 4. These preparations possess good flow properties and storage stability both at room temperature and at 50° C. The composition and physical properties of the printing inks prepared from them (Examples 16 to 18) are indicated in Table 5. They printed very well and reliably on the HP®1600 printer and in terms of the test criteria gave good test results comparable with those of Examples 5–12. The only difference was in the capacity for print recommencement of the printing ink according to Example 18, which showed slight nozzle blockage when printing was recommenced after storage, although this problem was eliminated after a short period of printing.

TABLE 4

Composition of the pigment preparations (amounts in % by weight)

| Component | Example 13 | Example 14 | Example 15 |
|---|---|---|---|
| C.I. Pigment Green 7 | 25.0 | | |
| C.I. Pigment Green 36 | | 25.0 | |
| C.I. Pigment Orange 64 | | | 25.0 |
| Tamol ® N9401 SA (comp. d) | 3.7 | 3.9 | |
| Dispersant mixture as in Example 1 | 5.4 | 5.0 | |
| Dispersant as in Example 2 | | | 5.4 |
| DI water | 65.6 | 65.8 | 69.3 |
| Proxel ® GXL (20% strength) | 0.2 | 0.2 | 0.2 |
| Preventol ® D2 | 0.1 | 0.1 | 0.1 |

TABLE 5

Composition and physical properties of pigment preparations in the form of printing inks (amounts in % by weight)

| | Example 16 | Example 17 | Example 18 |
|---|---|---|---|
| Pigment preparation of Ex. 13 | 2 | | |
| Pigment preparation of Ex. 14 | | 2 | |
| Pigment preparation of Ex. 15 | | | 3 |
| PEG 200 | 10.0 | 10.0 | 10.0 |
| 1,5-Pentanediol | 15.0 | 15.0 | 15.0 |
| 2-Pyrrolidone | 5.0 | 2.0 | 5.0 |
| DI water | 67.5 | 67.5 | 66.5 |
| Surfynol ® 104[1)] | 0.2 | | |
| Erkantol ® NR | 0.3 | 0.5 | 0.5 |
| Surface tension (mN/m) | 41.2 | 42.4 | 41.5 |
| Particle size (μm) | <200 | <200 | <200 |
| Viscosity (mPas) | 2.1 | 2.3 | 3.6 |

[1)]2,4,7,9-Tetramethyl-5-decyne-4,7-diol

What is claimed is:
1. A pigment preparation comprising

(a) at least one organic pigment,
(b) at least one compound selected from the group consisting of
  (i) alkoxylation products of a phenol-styrene condensate of formula (X)

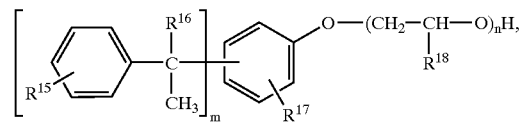

(X)

wherein
$R^{15}$ denotes hydrogen or $C_1$–$C_4$-alkyl,
$R^{16}$ represents hydrogen or $CH_3$,
$R^{17}$ denotes hydrogen, $C_1$–$C_4$-alkyl, $C_1$–$C_4$-alkoxy, $C_1$–$C_4$-alkoxycarbonyl, or phenyl,
m denotes a number from 1 to 4,
n denotes a number from 6 to 120, and
$R^{18}$ is independently for each —($CH_2$—CH($R^{18}$)—O—)— group hydrogen, $CH_3$, or phenyl, with the proviso that (i) when $CH_3$ is present in the —($CH_2$—CH($R^{18}$)—O—)— group, then 0 to 60% of the total $R^{18}$ is $CH_3$ and 40 to 100% of the total $R^{18}$ is hydrogen and (ii) when phenyl is present in the —($CH_2$—CH($R^{18}$)—O—)— group, then 0 to 40% of the total $R^{18}$ is phenyl and 60 to 100% of the total $R^{18}$ is hydrogen, and (ii) ionically modified phenol-styrene polyglycol ethers of formula (XI)

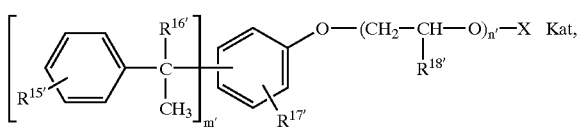

(XI)

wherein $R^{15'}$ denotes hydrogen or $C_1$–$C_4$-alkyl, $R^{16'}$ represents hydrogen or $CH_3$, $R^{17'}$ denotes hydrogen, $C_1$–$C_4$-alkyl, $C_1$–$C_4$-alkoxy, $C_1$–$C_4$-alkoxycarbonyl, or phenyl, m' denotes a number from 1 to 4, n' denotes a number from 6 to 120, and $R^{18'}$ is independently for each —(—$CH_2$—CH($R^{18'}$)—O—)— group hydrogen, $CH_3$, or phenyl, with the proviso that (i) when $CH_3$ is present in the —(—$CH_2$—CH($R^{18'}$)—O—)— group, then 0 to 60% of the total $R^{18'}$ is $CH_3$ and 40 to 100% of the total $R^{18'}$ is hydrogen and (ii) when phenyl is present in the —(—$CH_2$—CH($R^{18'}$)—O—)— group, then 0 to 40% of the total $R^{18'}$ is phenyl and 60 to 100% of the total $R^{18'}$ is hydrogen, X denotes —$SO_3^-$, —$SO_2^-$, —$PO_3^=$, or —CO—($R^{19}$)—$COO^-$, Kat is a cation selected from the group consisting of $H^+$, $Li^+$, $Na^+$, $K^+$, $NH_4^+$, and HO—$CH_2$—$CH_2$—$NH_3^+$, with the proviso that two Kat are present when X is —$PO_3^=$, and $R^{19}$ represents a divalent aliphatic or aromatic radical, and (c) at least one surface-active agent selected from the group consisting of (i) oxalkylated acetylene glycols in accordance with formula (I)

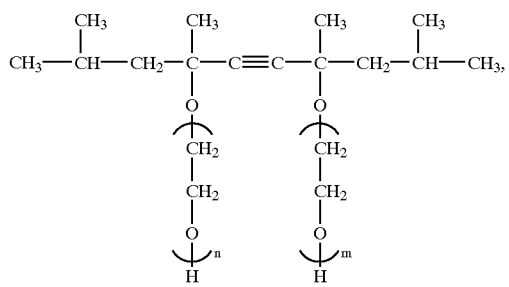

(I)

wherein n is 0 to 14, m is 0 to 14, and m+n is 0 to 14, and (ii) compounds selected from the group consisting of

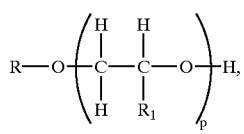

(II)

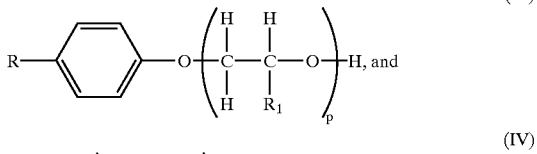

(III)

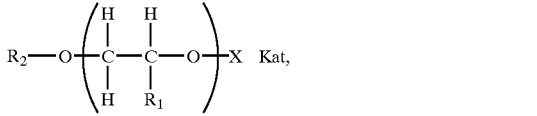

(IV)

wherein

R represents linear or branched $C_6$–$C_{18}$-alkyl, $R_1$ independently at each occurrence denotes H or $C_1$–$C_4$-alkyl, p is a number from 3 to 60, $R_2$ denotes R, phenyl, or $C_1$–$C_{18}$-alkyl-substituted phenyl, X denotes —$SO_3^-$, —$SO_2^-$, —$PO_3^=$, or —CO—($R^3$)—$COO^-$, $R_3$ represents a divalent aliphatic or aromatic radical, and Kat is a cation selected from the group consisting of $H^+$, $Li^+$, $Na^+$, $K^+$, $NH_4^+$, and HO—$CH_2$—$CH_2$—$NH_3^+$, with the proviso that two Kat are present when X is —$PO_3^=$.

2. A pigment preparation according to claim 1 wherein $R_3$ is $C_1$–$C_4$-alkylene, a $C_2$–$C_4$ monounsaturated radical, or optionally substituted phenylene.

3. A pigment preparation according to claim 1 wherein the organic pigment is an inclusion compound or intercalation compound of a pigment of formula (V)

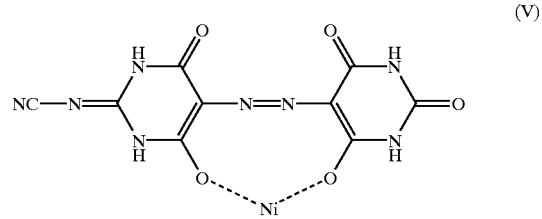

(V)

or formula (VI)

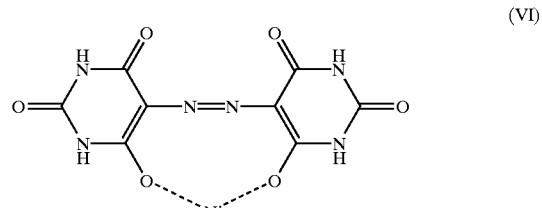

(VI)

and an included compound that is a cyclic or acyclic compound.

4. A pigment preparation according to claim 3 wherein the included compound is a carboxamide, a sulphonamide, a urea or substituted urea, a heterocycle, acetoguanamine or benzoguanamine.

5. A pigment preparation according to claim 1 wherein the phenol-styrene polyglycol ether or ionically modified phenol-styrene polyglycol ether has an HLB of from 10 to 20.

6. A pigment preparation according to claim 1 wherein $R^{19}$ is $C_1$–$C_4$-alkylene, a $C_2$–$C_4$ monounsaturated radical, or optionally substituted phenylene.

7. A pigment preparation according to claim 1 additionally comprising
(d) at least one condensation product based on
(A) sulphonated aromatics,
(B) aldehydes and/or ketones, and
(C) optionally, one or more compounds selected from the group consisting of nonsulphonated aromatics, urea, and urea derivatives.

8. A pigment preparation according to claim 7 wherein the condensation product (d) is based on
(A) at least one sulphonated aromatic selected from the group consisting of naphthalenesulphonic acids, phenolsulphonic acids, dihydroxybenzene-sulphonic acids, sulphonated ditolyl ethers, sulphomethylated 4,4'-dihydroxydiphenyl sulphone, sulphonated diphenylmethane, sulphonated biphenyl, sulphonated hydroxybiphenyl, sulphonated terphenyl, and benzenesulphonic acids,
(B) formaldehyde, and
(C) optionally, one or more compounds selected from the group consisting of phenol, cresol, 4,4-dihydroxydiphenyl sulphone, dihydroxydiphenylmethane, urea, dimethylolurea, melamine, and guanidine.

9. A pigment preparation according to claim 1 additionally comprising
(e) an organic solvent.

10. A pigment preparation according to claim 9 wherein the organic solvent (e) is an aliphatic $C_1$–$C_4$ alcohol, an aliphatic ketone, a polyol, a monohydroxy ether, 2-pyrrolidone, N-methyl-2-pyrrolidone, N-ethylpyrrolidone, N-vinylpyrrolidone, 1,3-dimethyl-imidazolidone, dimethylacetamide, or dimethylformamide.

11. A pigment preparation according to claim 1 comprising, relative to the pigment preparation,
(1) from 0.1 to 50% by weight of the pigment component (a),
(2) from 0.005 to 20% by weight of the phenol-styrene polyglycol ether or ionically modified phenol-styrene polyglycol ether component (b),
(3) from 0.005 to 10% by weight of the surface-active agent component (c),
(4) from 0 to 20% by weight of the condensation product component (d), and
(5) from 0 to 99.8% by weight of an aqueous-organic carrier medium consisting of water and optionally an organic solvent (e), and
(6) optionally customary additives.

12. A process for preparing a pigment preparation according to claim 1 comprising
(1) homogenizing at least one pigment of component (a) together with at least one dispersant of component (b) and optionally surface-active agents of component (c) in water to form a homogenized mixture that is then wet-comminuted and optionally dried,
(2) introducing the homogenized mixture into an aqueous-organic carrier medium comprising water and optionally an organic solvent of component (e), optionally a surface-active agent of component (c), and optionally other additives to form an aqueous pigment mixture, and
(3) homogenizing the aqueous pigment mixture to give the pigment preparation.

13. A set of printing inks comprising at least four printing inks having the colors black, cyan, magenta, and yellow wherein at least one such printing ink is a pigment preparation according to claim 1.

14. A set of printing inks according to claim 13 wherein
(1) the pigment of the black printing ink is a carbon black,
(2) the pigment of the cyan printing ink is a chlorinated Cu phthalocyanine pigment,
(3) the pigment of the magenta printing ink is a quinacridone pigment,
(4) the pigment of the yellow ink is an inclusion or intercalation compound of a pigment of formula (V)

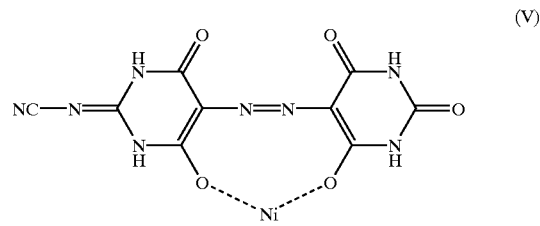

or formula (VI)

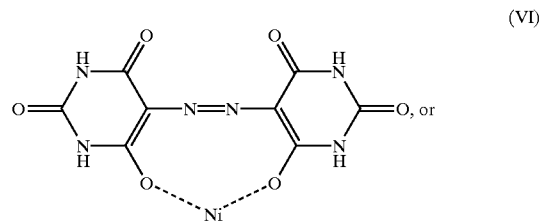

(5) a combination thereof.

15. A set of printing inks according to claim 13 comprising at least four printing inks having the colors black, cyan, magenta, and yellow wherein the black printing ink is a pigment selected from the group consisting of carbides, nitrides, borides, and silicides of the elements Ti, Zr, Hf, Si, Ge, and Sn and having an average primary particle size from 0.1 to 50 nm.

16. A set of printing inks according to claim 13 additionally comprising an orange and/or a green printing ink, wherein the pigment of the orange printing ink is a benzimidazolone or diketo pyrrolo-pyrrole pigment and the pigment of the green printing ink is a chlorinated or halogenated Cu phthalocyanine pigment.

17. A method of inkjet printing comprising applying a printing ink containing as colorant a pigment preparation according claim 1 to a substrate using an inkjet printing head.

18. A method according to claim 17 wherein the printing ink is sprayed continuously or discontinuously onto a substrate with formation of drops.

19. A method according to claim 17 wherein the substrate is a coated or uncoated paper, a photographic paper, a polymeric film, a foil, a textile, a glass, or a metal.

20. A method according to claim 17 wherein the substrate is a specialty paper for graphics applications having a format of larger than DIN A4.

* * * * *